US008972878B2

(12) United States Patent
Mohler et al.

(10) Patent No.: US 8,972,878 B2
(45) Date of Patent: Mar. 3, 2015

(54) SCREEN ICON MANIPULATION BY CONTEXT AND FREQUENCY OF USE

(75) Inventors: David S. Mohler, Arvada, CO (US); Jason H. Vick, Pine, CO (US)

(73) Assignee: Avaya Inc., Basking Ridge, NJ (US)

( * ) Notice: Subject to any disclaimer, the term of this patent is extended or adjusted under 35 U.S.C. 154(b) by 882 days.

(21) Appl. No.: 12/563,358

(22) Filed: Sep. 21, 2009

(65) Prior Publication Data

US 2011/0072492 A1 Mar. 24, 2011

(51) Int. Cl.
*G06F 3/048* (2013.01)
*H04L 29/06* (2006.01)
*G06F 3/0481* (2013.01)
*G06F 21/10* (2013.01)
*G06F 21/32* (2013.01)
*H04L 29/08* (2006.01)
*H04M 1/725* (2006.01)
*G06F 9/44* (2006.01)
*H04W 4/02* (2009.01)

(52) U.S. Cl.
CPC .............. *H04L 63/08* (2013.01); *G06F 9/4443* (2013.01); *G06F 9/4446* (2013.01); *G06F 3/04817* (2013.01); *G06F 21/10* (2013.01); *G06F 21/32* (2013.01); *G06F 2221/0708* (2013.01); *G06F 2221/2111* (2013.01); *G06F 2221/2149* (2013.01); *H04W 4/02* (2013.01); *H04L 67/24* (2013.01); *H04L 67/34* (2013.01); *H04L 67/306* (2013.01); *H04L 67/18* (2013.01); *H04M 1/72525* (2013.01); *H04M 1/7258* (2013.01)
USPC ............ 715/765; 715/708; 715/762; 715/744

(58) Field of Classification Search
CPC ... G06F 9/4443; G06F 9/4446; G06F 3/0481; H04L 63/08; H04L 21/31
USPC .................. 715/765, 708, 762, 744; 726/3, 7
See application file for complete search history.

(56) References Cited

U.S. PATENT DOCUMENTS

| | | | | |
|---|---|---|---|---|
| 5,905,492 | A * | 5/1999 | Straub et al. ................. | 715/744 |
| 5,959,624 | A * | 9/1999 | Johnston et al. .............. | 715/746 |
| 5,961,602 | A * | 10/1999 | Thompson et al. ........... | 709/229 |
| 5,991,735 | A * | 11/1999 | Gerace ......................... | 705/7.33 |
| 6,072,486 | A * | 6/2000 | Sheldon et al. ............... | 715/835 |
| 6,330,676 | B1 | 12/2001 | Kelsey | |
| 6,567,104 | B1 * | 5/2003 | Andrew et al. ............... | 715/762 |
| 6,633,315 | B1 * | 10/2003 | Sobeski et al. ............... | 715/762 |

(Continued)

OTHER PUBLICATIONS

Merlo, James L. et al. "Effect of Reliability on Cue Effectiveness and Display Signaling" Aviation Research Lab Institute of Aviation; Technical Report ARL-99-4/FED-LAB-99-3, May 1999, 48 pages.

(Continued)

*Primary Examiner* — Tadeese Hailu
(74) *Attorney, Agent, or Firm* — Sheridan Ross P.C.

(57) ABSTRACT

Dynamic device management is provided based on a change in context. The management can be for one or more of icons, application, operating system(s), preferences, display characteristics, and the like. Detection and/or monitoring of one or more of presence information, environmental information, user information, recent activity information, inbound/outbound communication information, external stimuli information, geopositional information, temporal information, calendar information, user information, biometric information, and security information can be used as inputs to determining a change in this context.

20 Claims, 5 Drawing Sheets

(56) References Cited

U.S. PATENT DOCUMENTS

| | | | |
|---|---|---|---|
| 7,707,226 | B1 | 4/2010 | Tonse |
| 8,631,158 | B1 | 1/2014 | Michaelis et al. |
| 2001/0019338 | A1* | 9/2001 | Roth ............................ 345/811 |
| 2004/0054726 | A1* | 3/2004 | Doss et al. .................... 709/205 |
| 2004/0090121 | A1 | 5/2004 | Simonds et al. |
| 2005/0097563 | A1* | 5/2005 | Bidet et al. ................... 719/310 |
| 2005/0114493 | A1* | 5/2005 | Mandato et al. ............. 709/223 |
| 2006/0107232 | A1 | 5/2006 | Salt et al. |
| 2008/0004088 | A1* | 1/2008 | Lundell et al. ............. 455/575.1 |
| 2008/0040488 | A1 | 2/2008 | Gupta et al. |
| 2008/0046840 | A1* | 2/2008 | Melton et al. ................. 715/825 |
| 2008/0235349 | A1* | 9/2008 | Caspi et al. ................... 709/218 |
| 2008/0307362 | A1* | 12/2008 | Chaudhri et al. ............. 715/835 |
| 2009/0037832 | A1* | 2/2009 | Falchuk et al. ............... 715/764 |
| 2009/0055739 | A1 | 2/2009 | Murillo et al. |
| 2009/0132378 | A1* | 5/2009 | Othmer et al. .................. 705/14 |
| 2009/0193365 | A1* | 7/2009 | Sugiura ......................... 715/840 |
| 2009/0205040 | A1 | 8/2009 | Zunke |
| 2009/0266764 | A1* | 10/2009 | Kawakatsu .................... 210/653 |
| 2009/0327883 | A1* | 12/2009 | Robertson et al. ............ 715/273 |
| 2010/0050185 | A1* | 2/2010 | Doss et al. .................... 718/108 |
| 2010/0229050 | A1* | 9/2010 | Konno ............................ 714/49 |
| 2010/0229090 | A1* | 9/2010 | Newton et al. ................ 715/702 |
| 2010/0332496 | A1 | 12/2010 | Horvitz et al. |
| 2011/0071884 | A1 | 3/2011 | Michaelis et al. |
| 2011/0071889 | A1 | 3/2011 | Erhart et al. |

OTHER PUBLICATIONS

U.S. Appl. No. 12/055,071, filed Mar. 25, 2008, Michaelis et al.

* cited by examiner

SCREEN ICON MANIPULATION BY CONTEXT AND FREQUENCY OF USE

FIELD OF THE INVENTION

One exemplary aspect of the present invention is directed toward device management based on context. Even more particularly, one exemplary aspect is directed toward managing one or more icons, applications and operating systems based on a detected context or change in context.

BACKGROUND

With increased popularity of both fixed and mobile devices, some with touch screens, efficient management of function and application icons is becoming increasingly important. Even the case of standard displays and navigational apparatuses, changes in context would be a useful improvement.

Icons can be manually moved, arranged by last use, order of download, alphabetical order, size, type, and several other criteria. However, many of these fall short of offering the user maximum utility. What is desired is the ability to arrange icons on screens where each of the screens represent a context, and where the icons are further arranged by cache or frequency of use, rather than simply by last use. If icons where arranged by context and frequency of use, the icons that the user will most often need will be more readily accessible.

Context is not necessarily presence based, but as discussed herein, can include many factors including presence, environmental factors, personal preferences, location information, speed information, network information, and the like. For example, if a user is traveling on business they might want icons for their favorite travel partners, a GPS mapping function, and other such travel-centric functions displayed independent of where they are located currently. Further, context is not necessarily temporal based. For example, a user might need to adopt a personal context during work hours to handle a matter that can't wait. These exemplary factors driving context are distinguishable from prior technologies that use temporal or physical factors as the sole driver of the context. Actual context can be derived based on typed keyword, user activity, indication on a contextual toolbar, a user indicated device mode, a combination of temporal, physical and other factors.

SUMMARY

Personal computers and portable touch-screen devices, such as the iPhone®, allow icon manipulation and management based on one or more of an "auto arrange" feature and user manipulation. In general, a user can move and rearrange icons within a graphical user environment, and can also edit the icon by, for example, changing the graphic associated with the icon and/or renaming the icon based, for example, on a user preference. These icons are typically shortcuts that allow access to one or more of an application, a document, a web page, multimedia content, a URL address, or other information, and are in general a pointer that includes a path to information that can be either remote or local.

One exemplary embodiment disclosed herein is that icons can be sorted and displayed by the context of the user. Further, display of the icons can be further sorted, arranged, added/removed based on caching or frequency of use over a protracted period, such that for each context the user is presented with the icons most germane to their context and common uses within that context. As is known, displaying or sorting of icons can be done manually, by size, function, order of download, last use, alphabetical, etc. Once a sorting preference is established, it is maintained, independent of user context.

In accordance with an additional exemplary embodiment, complex context is used rather than a simply one that is presence, location or time based. This can include, but is not limited to, keywords, user activity, indication on a contextual toolbar, a user indicated device mode, key strokes, open windows/folder, activities and/or changes in activity. This goes beyond rich presence because while some similar factors may be considered, it is not fundamentally presence driven, but is instead a richer, context-driven technique.

For example, let's say a device's user is at work and their current context is "work" as determined by having a variety of work folders, applications, documents, or the like, open. The user can enter a keyword such as "personal," and the device could interpret this as a request for a change in context and could offer the user a display of icons related to "personal" activities. The user could signal a change in context via equivalent change of device mode, or toolbar selection, or alternatively, the change in context could be derived from changes in activity. As an example, a toolbar could be provided that has drop-down menus corresponding to already stored contexts. From this toolbar, any of the stored contexts could be chosen as well as the ability to modify existing contexts and the addition of new contexts. Further, changes in context can drive not only the manipulation and changing of icons, but could also be used to govern operation of the device, as well as licensing of one or more applications on a device.

For example, a user could define geographic boundaries, such as by utilizing GPS coordinates to define a "work" area, and similarly, GPS coordinates to define a "home" area. When the GPS associated with the device detects presence in one of the predefined geographic areas, the device could automatically switch between the "work" context and the "personal" context. The extension of these basic concepts to licensing of one or more applications and/or operating systems could also be included. For example, the user at work may have a site license for an office suite as well as some specialized applications the user frequently uses for work. In that the user is carrying their laptop between work and home, an employer might be concerned about a potential license violation, should the employee use the licensed product outside the work environment. Through the use of context detection as outlined above, a change in context, e.g., from the work environment to the home environment, could be used to trigger the "de-licensing" of the work-based application(s) on the user's laptop. This could ensure the employer was fully complying with the terms and conditions of the license agreements associated with the one or more work-based applications.

Extending this concept even further, firewall and/or network authentication can be handled in a similar manner. Therefore, in addition to be able to change icons and/or applications based on context, context could also be used as a supplement to authentication, or in place of some existing authentication techniques. For example, and again based on, for example, a predefined area defined by GPS coordinates, context e.g., location, of the user could be sensed and utilized for network authentication or to supplement network authentication.

An exemplary aspect of this invention could also be particularly useful for mobile devices with limited space screens where multiple contexts are common. These techniques could be applied to devices with touch screens or traditional displays with traditional point and entry means, such as a mouse and keyboard.

In accordance with another exemplary embodiment, context detection allows the dynamic manipulation of one or more features on a device, based on one or more of presence, environmental factors, recent activity, inbound/outbound communications, external stimuli, geopositional information, temporal factors, calendar/appointment matching, user information, biometric information, security information, and the like. Based on one or more of these factors, the dynamic manipulation of icons on a graphical user portion of the device can be manipulated, in addition to optionally also dynamically altering the functionality of the device based on these factors.

For example, the dynamic manipulation of functionality can include the enabling or disabling of one or more applications, enabling or disabling access to information, enabling or disabling active portions of the interface, and enabling or disabling or modifying a contextual toolbar that can be provided within the interface. For example, this toolbar can be populated with one or more rules that assist with the governing of the dynamic change in context. These rules can be one or more of user based, system based, based on machine learning, based on user input, artificial intelligence, policies, such as system policies, or the like. For example, a user can enter various rules and preferences that govern their preferences as to how the icons and which application should be present when they are in the "home" environment. A combination of user-based rules and, for example, IT administrator based rules, can be used to govern the icons, applications, etc. when the user is in the "work" environment. As will be appreciated, a ranking can be associated with one or more of these rules that allow certain rules to dominate, or override, other rules that may conflict with the governing rule.

In conjunction with this toolbar, an interface can be provided that allows the creation, editing, and deleting of preferences associated with a particular context. For example, a user can define a context, such as "home," "work," "traveling," or the like and then begin defining device operation during each of these contexts. In addition to this static assignment of one or more of applications and icons, the icons, applications, etc., can also be dynamically managed either within that predefined context, or more globally to include entry into and exit out of a predefined context. Granularity of management can also be customized based on one or more of user preferences, administrator preferences, or by the context owner.

For example, a context can be associated with a particular store. Upon the user entering the store, operation of a device, such as icons and/or applications on the device can be updated based on the detection that the user is in the store. In one exemplary embodiment, the store would be the "owner" of the context and, for example, push advertising, or store-centric applications to the user's device. For example, in a grocery store environment, a user could be provided with an application, that only works in that grocery store, that allows the navigation and finding of items within the store. Since the store is the "owner" of this context, upon the user leaving the store, the context is removed or otherwise disabled on the device and the device reverts back to some other context.

For security reasons, devices could be equipped with a separate "sandbox" that is isolated from the main device's functionality. This could allow more user confidence in accepting pushed-context from, for example, stores as in the above embodiment without worrying about whether the pushed-context has access to, or creates a security concern, in relation to other applications, information, or the like, on the device. The user could of course be provided with options that allow the user to select or reject the installation of that context on their particular device as well as be provided with an option of saving a profile or preferences specific to that pushed-context so that the next time they visit that context, their preferences could be restored.

In accordance with another exemplary embodiment, one or more of an operating system, one or more applications, and one or more icons can be dynamically manipulated based on context. This functionality can be extended to one or more of a computer, a mobile device, such as a telephone, tablet, or netbook PC, a touch screen device, and the like. Moreover, this functionality could be extended to set-top boxes as well as vehicle-based command systems. In any of these environments, the fundamental operation of the device, preferences about how the device operates, and functionality of the device, can be regulated based on a detected or sensed context. While the exemplary embodiments discussed herein will generally be directed toward icon and application manipulation based on context, it should be appreciated that any aspect of a device can be regulated based on context, and the device can be in any environment, providing any function.

Accordingly, exemplary embodiments of this invention are directed toward device management. More specifically, exemplary embodiments are directed toward device management based on context.

Additional aspects of the invention are related to icon management based on context.

Even further aspects of the invention are related to application management based on context.

Even further aspects of the invention are related to operating system management based on context.

Even further aspects of the invention are related to license management based on context.

Aspects of the invention are also related to authentication management based on context.

Additional aspects of the invention are related to dynamic manipulation of a device, such as a PC, mobile device, touch screen device, mobile command center, or the like, based on context.

Even further aspects of the invention are related to detection and/or monitoring of one or more of presence information, environmental information, user information, recent activity information, inbound/outbound communication information, external stimuli information, geopositional information, temporal information, calendar information, user information, biometric information, and security information as inputs to determining a current context.

Additional aspects of the invention are related to providing one or more interfaces that allow management of how context affects device operation.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The exemplary embodiments of the invention will be described in detail, with reference to the following figures, wherein.

DETAILED DESCRIPTION

The invention will be described below in relation to a computing environment. Although well suited for use with mobile computing devices, the invention is not limited to use with any particular type of device or configuration of system elements and those skilled in the art will recognize that the disclosed techniques may be used in any environment in which it is desirable to provide context-based changes to operation. The various devices described herein can be any device such as a telephone, speakerphone, cellular phone, SIP-enabled endpoint, softphone, PDA, conference system, video conference system, wired or wireless communication device, PC, desktop computer, laptop, netbook, or in general any device that is capable of supporting a change based on a contextual change.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
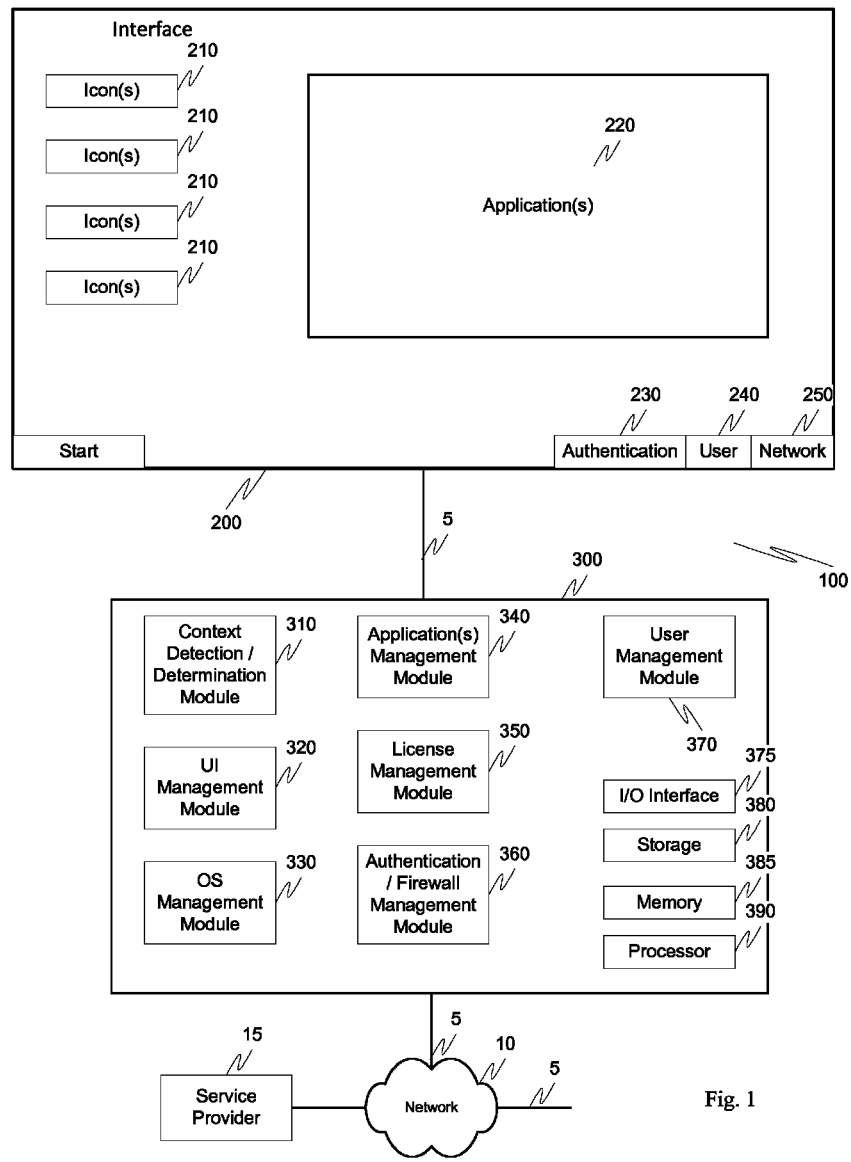
FIG. 1 illustrates an exemplary context-sensitive system according to this invention.

FIG. 1 illustrates an exemplary context sensitive system 100 according to this invention. The context sensitive system 100 includes a display 200 as well as context module 300. The exemplary display 200 includes, for example, one or more icons 210, one or more applications 220, and one or more indicator portions that provide information relating to authentication information 230, user information 240, and network information 250.

Connected via link 5, is the context module 300 that includes a context detection and/or determination module 310, a user interface management module 320, an operating system management module 330, application management module 340, license management module 350, authentication and/or firewall management module 360, user management module 370, as well as I/O interface 375, storage 380, memory 385, processor 390, as well as additional well known componentry (not shown). The context sensitive system 100 can be connected, wired, or wirelessly to one or more networks 10 and service provider(s) 15 via one or more links 5.

In operation, the context sensitive system 100, in cooperation with a context detection and/or determination module 310, monitors the context associated with the system. More specifically, one or more inputs corresponding to one or more of a change in presence information, environmental information, recent activity information, inbound communication information, GPS information, geopositional information, external stimuli, temporal information, user information, biometric information, or in general, any information, is monitored. A determination is then made as to whether this input information corresponds to a contextual change for which an updating of the system is desired. For example, based on one or more of artificial intelligence or machine learning based on user input, system rules, user rules, and policies, the context detection and/or determination module 310 determines whether the input information constitutes a contextual change. Optionally, the context detection and/or determination module 310 can further determine whether this contextual change meets, for example, a predetermined threshold and justifies an updating or change in the display and/or operation of the system 100. As discussed, once it is determined that a contextual change is needed, based on the one or more types of input information, at least one or more of user interfaces, applications, and operating systems can be updated based on this contextual change.

As an example, assume a user has a business laptop that they use for both work and pleasure. While at work, the user typically uses certain applications, is authenticated to a specific work-centric network and may have access to certain types of information hosted by the employer. At home, perhaps the user typically uses a different set of applications, prefers to utilize a different operating system, and authenticates to different network, such as a home-based network that may include, for example, media servers, shared printers, and the like.

In accordance with one exemplary embodiment, when a user logs on and authenticates to the business network, the context sensitive system 100, such as a laptop PC or netbook, could boot using a specific operating system, and populate the interface or display 200 with the icons representative of certain business-centric applications as well as provide authentication information 230 that the user is authenticated to the business-centric network which is also reflected in network portion 250. When the user logs out at the end of the day, the context detection and/or determination module 310 can detect this activity, and perhaps anticipate that the user is finished for work for the day, given the time and logout sequence, and expects that the user's next login, for example, based on historical information, will be from home. Therefore, for example, when the context sensitive system 100 is booted up at home, or, for example, detects a home network, the various icons, applications, authentication, and the like, can be modified in accordance with the user's home profile. For example, the user's home profile can include a certain set of applications, which are licensed for home use, can automatically map drives, servers, etc., so the user can access their home media server, printers, and the like, and could also, optionally, reboot the system so that it is running on, for example, a Linux® operating system.

As discussed, this change in context which causes a change in the context sensitive system could be based on artificial intelligence or machine learning based on user input, system rules, user rules, and/or policies. For example, a user can configure various contexts and have these associated with a user profile that can be loaded, for example, upon the detection of a particular context-changing event. Similarly, policies, such as those dictated by, for example, a license agreement, can be factored into context-based changes in the context sensitive system 100. For example, and expanding upon the example above, license agreements associated with certain applications can be context sensitive such that, for example, certain applications are only allowed to be used within a certain geographically defined area. For example, assume a particular application is licensed by an employer. The employer can define a geographical area, such as via GPS coordinates, or via network authentication, and by policy limit the use of that application to when a user is "at work."

Continuing with the above example, assume the user takes their laptop on a work trip and the laptop is connected to the Internet via a broadband wireless network. Upon sensing this contextual change, the laptop could populate the display 200 with icons for applications, such as travel-centric applications, that the user routinely uses while traveling. The icons can include, for example, flight tracker applications, business expense reports, meeting schedules and agendas, and the like. In general, the display 200 can be updated to include any one or more icons, applications, and/or services that based on the detected context that may be useful to the user.

Therefore, as context changes, and in cooperation with one or more of the user interface management module 320, operating system management module 330, and application(s) management module 340, various ones or more of the interface or display 200, operating system and application(s), respectively, are managed.

In addition to items such as applications, authentication, and licensing, display characteristics can be altered based on context. For example, one or more of brightness, color schemes, desktop configuration, icon placement, or the like, can also be manipulated based on context based on or more of the types of monitored information.

In accordance with an additional exemplary embodiment, the licensing management module 350, as alluded to above, monitors one or more of context, location, and temporal information. Moreover, speed can optionally be monitored as it impacts context, with an assessment made as to whether one or more of the above items have met a threshold. If a threshold has been met, licensing of one or more applications can be enabled, disabled, or partially enabled. Moreover, one or more of content and/or application(s) can be partially disabled based on the terms of the license agreement and the context.

In a similar manner, authentication, such as to a network, can be updated based on context. For example, in similar to the above, one or more of context, location, and temporal information can be monitored. Optionally, speed can also be monitored as it impacts context. Upon a threshold being satisfied, the authentication can be updated that includes, for example, authenticate, de-authenticate, authentication to another domain, or the like.

In general, the context detection and/or determination module 310 monitors various types of information and determines an update, if any, based on the contextual change. For example, the contextual update can be based on user preferences. If a changed is desired to preferences, and upon the detection of a triggering event, the user's preferences can be updated. Similarly, if a detected contextual change requires an update to the user interface, and in cooperation with user interface management module 320, the context module 310 can update display 200 appropriately.

If a contextual change dictates the changing of one or more icons 210 on display 220, one or more icons 210 can be one or more added, removed, replaced, and/or modified with the cooperation of the user interface management module 320.

If the contextual change dictates a change in one or more applications, and in conjunction with the application management module 340, one or more applications are added, removed, replaced, or modified.

Similarly, if an operating system change is dictated by the change of context, the operating system can be switched, for example, through a reboot, or another operating system initiated, for example, through virtualization.

As discussed, one or more profiles may be associated with the user and/or with the device. These one or more profiles can be stored locally, or at a remote location, such as on a server. For example, a user may be associated with a work profile, a home profile, and a travelling profile. Similarly, a device may be associated with a work profile and a non-work profile.

For the user, this profile can contain information such as frequently used applications, preferences, and rules that govern which profile should be used based on the monitored information. As discussed, this monitored information can include one or more of location information, temporal information, presence information, environmental information, recent activity, inbound communication information, outbound communication information, GPS information, geopositional information, external stimuli, temporal information, user-specific information, biometric information, and the like. Upon the detection of one or more of these types of information, the comparison of this information to, for example, a threshold, one or more of the operation or appearance of the device can be updated based on a detected context, or change in context.

In accordance with one exemplary embodiment, the profile includes a plurality of lookup tables that correspond to different contextual scenarios for which the basis of a change in context can be made. Furthermore, and as discussed, the detection of a change in context can be through artificial intelligence, machine learning, based, for example, on user input, one or more system rules, one or more user rules, historical information and one or more policies.

In a similar manner, the device profile can monitor the context of the device and change, for example, the operation or display characteristics of the device based on the detected context. This can be especially useful for licensing enforcement where, for example, the device is only allowed to be used within a certain predefined geopositional boundary relative to a work place. Should the device be taken out of that geopositional boundary, the device could, for example, be disabled until it is returned to the predefined geopositional boundary. Network authentication can be handled in a similar manner with, for example, one or more of a user interface, icons, applications, operating systems, or operation being modified based, for example, on which network the device is authenticated to.

In accordance with yet another exemplary embodiment, the profile can be stored at a central location, such as a server, and downloaded to a device when, for example, a user logs in. Therefore, a "generic" device can be updated based on one or more preferences stored in the remote profile. For example, a user logging on to a device could trigger a detected change in context (e.g., a new user) and this change of context used as the basis for manipulating one or more preferences, configuration of the user interface, icons, applications, operating system, performance, or the like.

Figure 2:
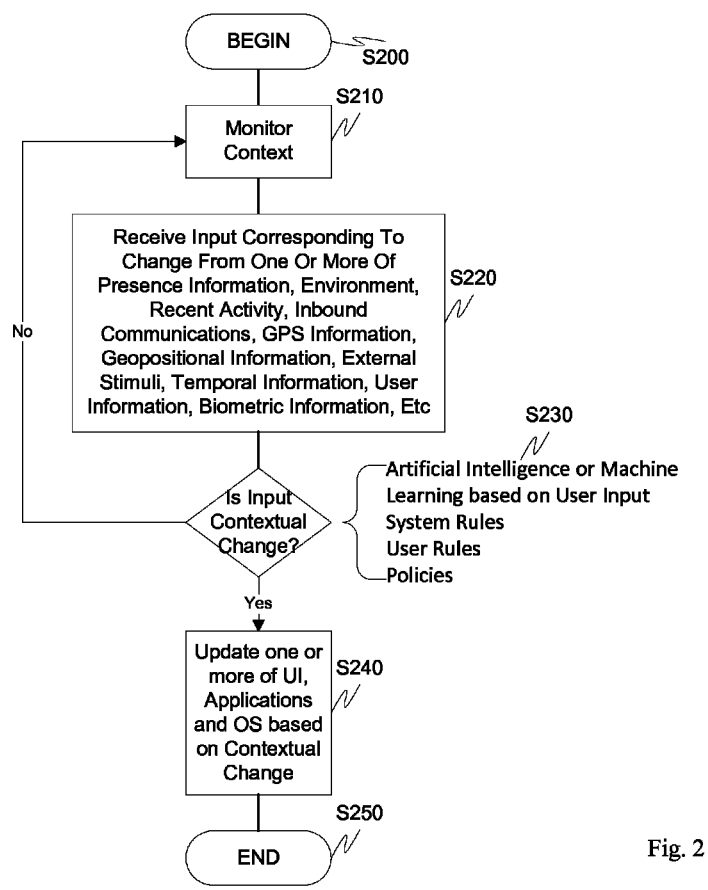
FIG. 2 is a flowchart outlining an exemplary method for context monitoring according to this invention.

FIG. 2 illustrates an exemplary method of contextual monitoring according to this invention. In particular, control begins in step S200 and continues to S210. In step S210, context is monitored. Next, in step S220, input is received corresponding to a detected change from one or more of presence information, environmental information, recent activity information, inbound/outbound communication information, outbound communication information, GPS information, geopositional information, external stimuli, temporal information, user information, biometric information, etc. Control then continues to step S230.

In step S230, a determination is made whether the input constitutes a contextual change. As discussed, this determination can be at least based on one or more of artificial intelligence or machine learning based, for example, on user input or device usage, system rules, user rules, and policies. Next, in step S240, one or more of the user interface, application(s), and operating system can be updated based on the detected contextual change. Control then continues to step S250 where the control sequence ends.

Figure 3:
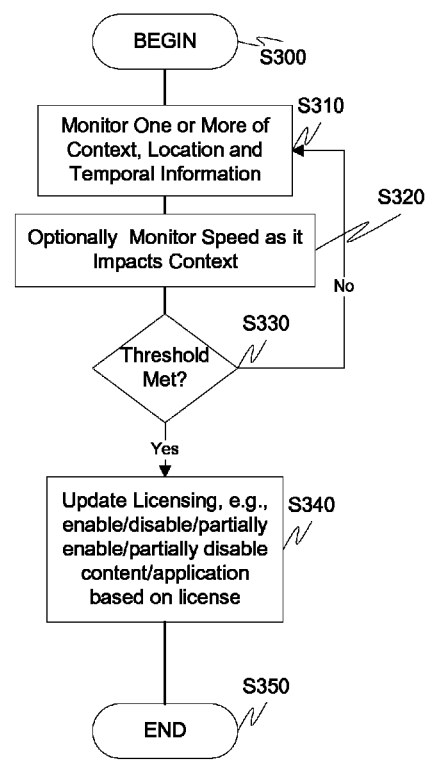
FIG. 3 is a flowchart outlining an exemplary method for licensing management according to this invention.

FIG. 3 outlines an exemplary method for license management according to this invention. In particular, control begins in step S300 and continues to step S310. In step S310, one or more context, location and temporal information are monitored. Next, in step S320, speed can optionally be monitored as it impacts context. Then, in step S330, a determination is made whether a threshold has been met. If a threshold has not been met, control jumps back to step S310. If a threshold has been met, control continues to step S340.

In step S340, licensing can be updated and can include one or more of an enabling, disabling, partially enabling, partially disabling, partially disabling content and/or application(s) of the like, based on license requirements. Control then continues to step S350 where the control sequence ends.

Figure 4:
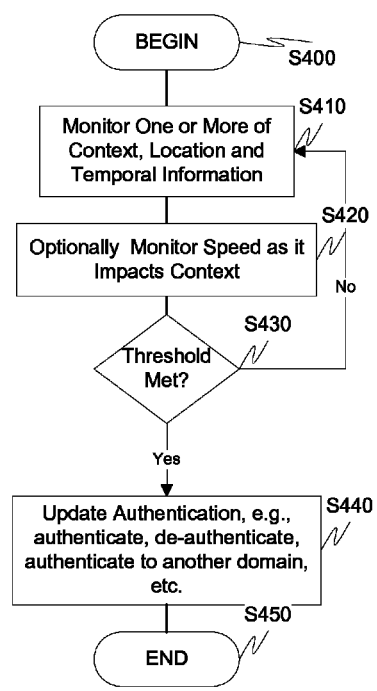
FIG. 4 is a flowchart outlining an exemplary method for context monitoring according to this invention.

FIG. 4 outlines an exemplary method for authentication management according to this invention. In particular, control begins in step S400 and continues to step S410. In step S410, one or more context, location, and temporal information are monitored. Next, in step S420, speed can optionally be monitored as it may have an effect on context. Then, in step S430, a determination is made whether a threshold has been met. If a threshold has not been met, control jumps back to step S410. Otherwise, if a threshold has been met, control continues to step S440.

In step S440, authentication can be updated, for example, such as authenticate, de-authenticate, authenticate to another domain, or the like. Control then continues to step S450 where the control sequence ends.

Figure 5:
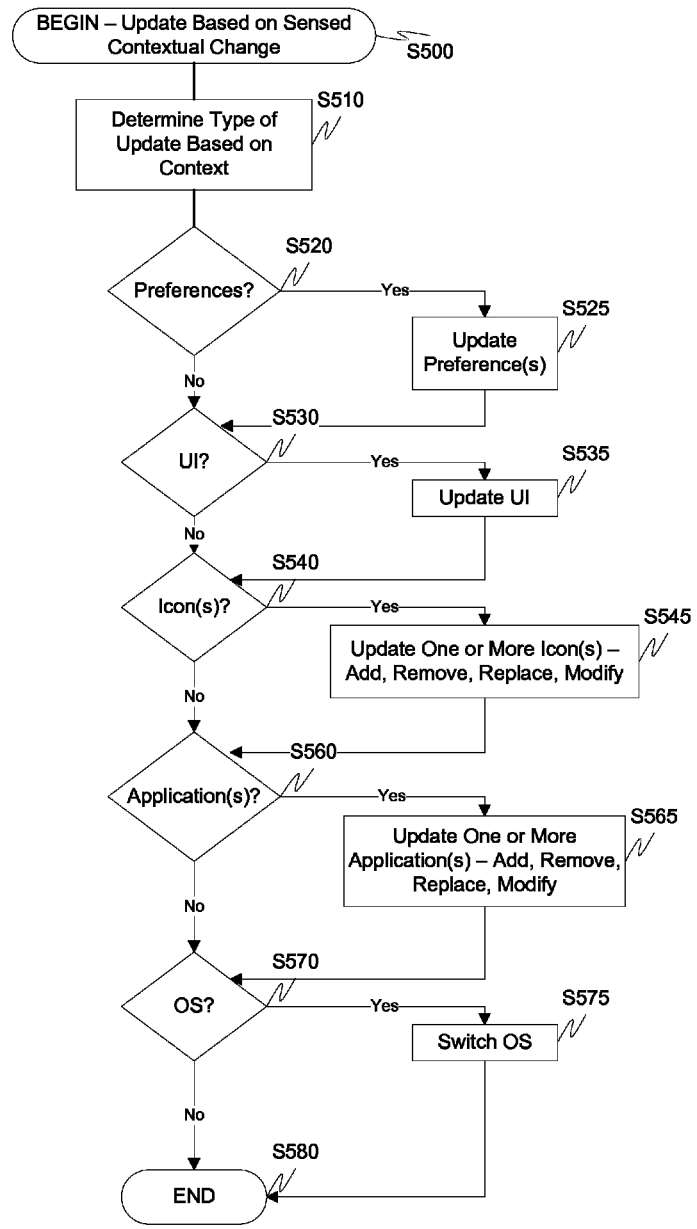
FIG. 5 is a flowchart outlining an exemplary method for updating a system based on a contextual change according to this invention.

FIG. 5 outlines an exemplary method of updating based on a determined contextual change. Specifically, control begins is step S500 and continues to step S510. In step S510, a determination is made as to which type of update is needed based on the determined contextual change.

If the update is preferences, in step S520, control continues to step S525 where one or more preferences are updated.

If the update is for the user interface(s), in step S530 control continues to step S535 where the user interface is updated.

If the update is for the management of one or more icons, in step S540 control continues to step S545 where one or more icons are added, removed, replaced or modified.

If the update is for one or more applications, in step S560 control continues to step S565 where one or more applications or one or more are added, removed, replaced, modified, and operation changed.

If the update is for operating system or operating system level change, in step S570 control continues to step S575 where management of the operating system(s) can occur. Control then continues to step S580 where the control sequence ends.

A number of variations and modifications of the invention can be used. It would be possible to provide or claims for some features of the invention without providing or claiming others.

The exemplary systems and methods of this invention have been described in relation to enhancing device operation through context monitoring. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method to manage device characteristics based on a detected user context comprising:
   sensing one or more inputs;
   determining, by a processor, if the sensed one or more inputs correspond to a change in the detected user context, wherein the change in the user context is that a user has entered a store;
   updating an interface based on the determining, wherein updating the interface is accomplished by providing an application that works only in the store and wherein the application allows navigation to find items within the store;
   sorting and updating, based on a frequency of use of icons over a time period for each detected user context, the icons in the interface such that, for each detected user context, the user is presented with the icons most germane to that detected user context; and
   removing the user context when the user leaves the store by removing or disabling the application that allows navigation to find items within the store.

2. The method of claim 1, wherein the one or more inputs are one or more of presence information, environmental information, recent activity information, inbound or outbound communication information, Global Positioning Satellite (GPS) information, geopositional information, external stimuli information, temporal information, user information and biometric information.

3. The method of claim 1, further comprising basing network authentication on the context.

4. The method of claim 1, wherein the updating the interface further includes one or more of updating preferences, display characteristics, one or more icons, and user interface characteristics.

5. The method of claim 1, wherein one or more context profiles are associated with one or more of the user and a device, and speed is sensed as one of the one or more inputs.

6. The method of claim 1, wherein one or more context profiles are associated with one or more of the user and a device, and are either stored on the device or at a remote location.

7. The method of claim 1, wherein the detected user context is performed in real-time or near real-time and the managing of device characteristics is on a set-top box or a vehicle based command system.

8. The method of claim 1, wherein a profile governing one or more of the updated features is transferred to the device upon the detected change in the user context.

9. A non-transitory computer-readable information storage medium, having stored thereon instructions, that when executed by one or more processors, perform the functions of claim 1.

10. The method of claim 1, wherein updating the interface based on the determined change in the user context comprises updating an operating system based on the determined change in the user context.

11. The method of claim 1 further comprising updating licensing of one or more applications based on the change in the detected user context.

12. A system to manage device characteristics based on a detected user context comprising:
   a context detection module and processor that sense one or more inputs and determine if the sensed one or more inputs correspond to a change in the detected user context, wherein the change in the detected user context is that a user has entered a store; and
   a user interface module that updates an interface based on the determining operation, wherein updating the interface is accomplished by providing an application that works only in the store and wherein the application allows navigation to find items within the store, sorts and updates, based on a frequency of icons use over a time period for each detected user context, the icons in the interface such that, for each detected user context, the user is presented with the icons most germane to that detected user context, and removes the user context when the user leaves the store by removing or disabling the application that allows navigation to find items within the store.

13. The system of claim 12, wherein the one or more inputs are one or more of presence information, environmental information, recent activity information, inbound or outbound communication information, Global Positioning Satellite (GPS) information, geopositional information, external stimuli information, temporal information, user information and biometric information.

14. The system of claim 13, wherein the device is a mobile device, a Personal Computer (PC), a tablet PC, a computer, a workstation, a cell phone, a personal digital assistant, a mobile phone, a laptop, a mobile command center, a mobile device having one or more processors, a portable entertainment device and a netbook.

15. The system of claim 12, further comprising an authentication management module that bases network authentication on the detected user context.

16. The system of claim 12, wherein the updating the interface further includes one or more of updating preferences, display characteristics, one or more icons, and user interface characteristics.

17. The system of claim 12, wherein one or more context profiles are associated with one or more of the user and a device, and speed is sensed as one of the one or more inputs.

18. The system of claim 12, wherein one or more context profiles are associated with one or more of the user and a device, and are either stored on the device or at a remote location.

19. The system of claim 12, wherein the detected user context is performed in real-time or near real-time.

20. The system of claim 12, wherein a profile governing one or more of the updated features is transferred to a device upon the detected change in the user context.

* * * * *